July 7, 1931.    W. D. COOPER    1,813,230
TELEGRAPHIC TRANSMITTING INSTRUMENT
Filed May 20, 1929    6 Sheets-Sheet 1

Inventor
William D. Cooper
By his Attorneys

July 7, 1931. W. D. COOPER 1,813,230
TELEGRAPHIC TRANSMITTING INSTRUMENT
Filed May 20, 1929 6 Sheets-Sheet 2

Inventor
William D. Cooper
By his Attorneys
Merchant + Kilmore

July 7, 1931.  W. D. COOPER  1,813,230
TELEGRAPHIC TRANSMITTING INSTRUMENT
Filed May 20, 1929   6 Sheets-Sheet 3

Inventor
William D. Cooper
By his Attorney

July 7, 1931. W. D. COOPER 1,813,230
TELEGRAPHIC TRANSMITTING INSTRUMENT
Filed May 20, 1929 6 Sheets-Sheet 4

Inventor
William D. Cooper
By his Attorneys

July 7, 1931. W. D. COOPER 1,813,230
TELEGRAPHIC TRANSMITTING INSTRUMENT
Filed May 20, 1929 6 Sheets-Sheet 5

Inventor
William D. Cooper
By his Attorneys
Merchant & Kilgore

July 7, 1931. W. D. COOPER 1,813,230
TELEGRAPHIC TRANSMITTING INSTRUMENT
Filed May 20, 1929  6 Sheets-Sheet 6

Inventor
William D. Cooper
By his Attorneys

Patented July 7, 1931

1,813,230

UNITED STATES PATENT OFFICE

WILLIAM D. COOPER, OF ST. PAUL, MINNESOTA

TELEGRAPHIC TRANSMITTING INSTRUMENT

Application filed May 20, 1929. Serial No. 364,452.

This invention relates to telegraphic transmitting instruments and is in the nature of an improvement on or modification of the instruments disclosed and claimed in my prior Patent 1,632,273 of date June 14, 1927 and my pending application Serial Number 240,433 filed December 16, 1927.

Generally stated, the invention consists of the novel devices and combinations of devices hereinafter described and defined in the claims.

In the accompanying drawings, which illustrate the invention, like characters indicate like parts throughout the several views.

Referring to the drawings.

The various parts of the complete apparatus are mounted on a common base 17 so that they consitute a portable self-contained device. Most of the principal elements of device, however, are supported by a frame 18 which frame is secured to the base 17 by means of screws or bolts 19.

The device has a bank of keys that is divided into two series, (a and b). Each key in series a is adapted to be manipulated to send a different predetermined number of short impulses or dots and each key in series b is adapted to be manipulated to send a predetermined number of different long impulses or dashes.

Figure 1:
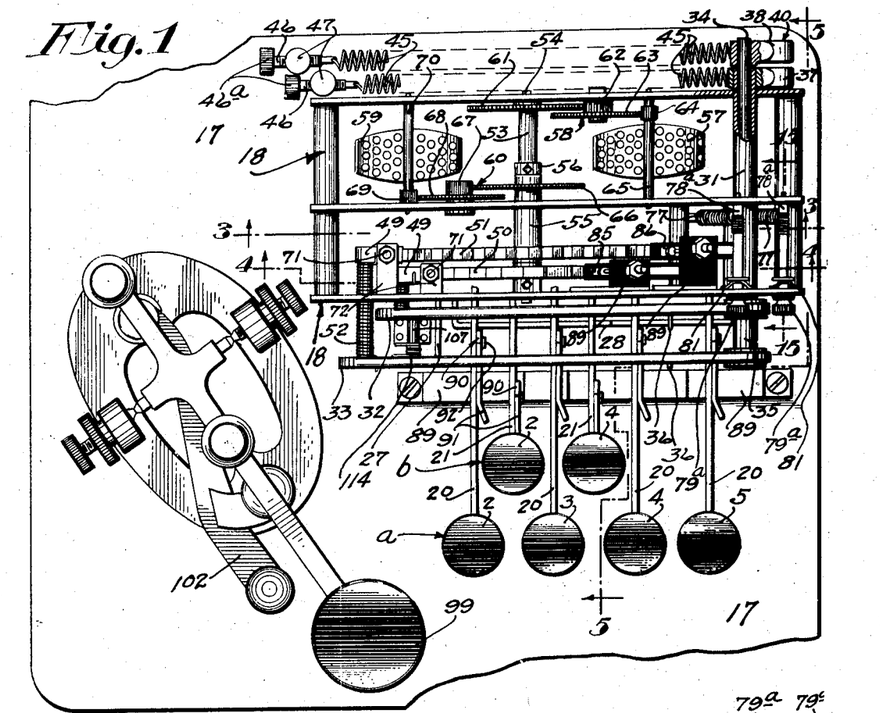
Fig. 1 is a plan view of the device some parts being broken away and some parts being shown in section.

The keys in series a control mechanism for sending dots numbering from 2 to 5 are indicated by the numerals 2, 3, 4 and 5, respectively, from left to right in respect to Fig. 1 and the keys in series b, of which there are only two illustrated, are indicated by the numerals 2 and 4 and control mechanism for sending dashes numbering 2 and 4, respectively.

The several keys in series a are mounted on the free outer ends of the pivoted key levers 20 and the keys in series b are mounted on the free outer ends of pivoted key levers 21. These levers 20 and 21 extend through an opening 22 in the frame 18 and are all pivoted at their inner ends on a rod 23 that is mounted in lugs 23ᵃ that project upward from the base 17. The levers 21 are pivoted to the rod 23 between certain of the levers 20 and extend outward parallel therewith but are turned upward near their free ends so that the series of keys b thereon are forward and in a higher plane than the keys in series a. The keys being thus arranged may be readily operated with the fingers of one hand.

The levers 20 and 21 are held in proper spaced relation on the rod 23 by spacing sleeves 24, and said levers are each independently held in their inoperative upper positions against the frame 18 at the top of the opening 22 by light springs 25. These light springs 25 are coiled around the spacers 24 adjacent to the levers 20 and 21 and their upper ends of each thereof engage the under side of an adjacent lever 20 or 21 forward of its pivoted point and the lower ends engage the upper ends of tension adjusting screws 26. The screws 26 project upward through the base 17 and may be readily adjusted to produce a desired spring tension on the levers 20 or 21.

Figures 9, 10:
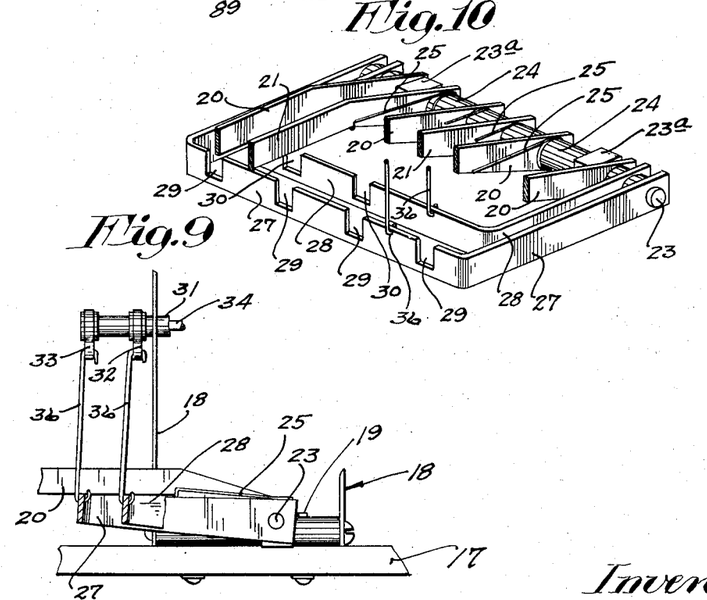
Fig. 9 is a section taken on the irregular line 9—9 of Fig. 2.
Fig. 10 is a detail perspective view showing the key operated lever and yoke mechanism, some parts being broken away.

Yokes 27 and 28 are pivoted at their ends near the ends of the rod 23 outside of the levers 20 and 21, and their back portions underlie the said levers 20 and 21 near their intermediate portion. By reference to the drawings and especially to Fig. 10, it will be noted that the yoke 28 works within the yoke 27. The back portions of the yoke 28 normally engage the under side of the levers 20 and will be moved downward by manipulation of any one thereof, and the yoke 27 normally engages the under side of the levers 21 and will be moved downward by manipulation of either thereof. In the yoke 27, below each of the levers 20, is cut a notch 29 and in the yoke 28 below each of the levers 21 is cut a notch 30. The levers 20 will, when depressed, work in the notches 30 in the yoke 28 and will not engage said yoke 28, and the levers 21, when depressed, will work in the notches 29 and will be inoperative on the yoke 27.

Mounted near one end of a hollow shaft 31 that extends through and is journaled in the frame 18 is a relatively long lever 32 and a lever 33 similar to the lever 32 is mounted on the outer end of a shaft 34 that extends through the hollow shaft 31 and said lever 33 is spaced from the lever 32 by means of a spacing collar 35 on the shaft 31 therebetween. The levers 32 and 33 are operatively connected to the yokes 28 and 27, respectively, for common movement therewith by means of links or the like 36.

Mounted on the rear ends of the hollow shaft 31 and shaft 34 for common movements therewith are U-shaped rocker levers 37 and 38. These levers 37 and 38 are substantially alike and each includes a hub 39 and a downwardly projecting arm 40 that is offset from the hub 39 and an inturned portion 41 on the lower end of the arm 40.

Adjustment screws 42 are journaled at their intermediate portions in the offset portions of the levers 37 and 38 and extend therethrough and are reduced at their lower ends to form trunnions 43 that are journaled in the inturned lower ends 41 of the arms 40. Near their tops the adjustment screws 42 are provided with knurled heads. The adjustment screws 42 are screw threaded between the offset portions and inturned lower ends of the arms 40 and are spaced from the arms 40.

On the screw-threaded portions of the adjustment screws 42 and adjustable up and down between the offset upper portions of the levers 37 and 38 and the inturned lower ends of the arms 40 thereof by turning the heads 41 of said screws 42, are nut-like members 44 to which tension springs 45 are attached and which nut-like members 44 act as adjustable leverage points.

The tension springs 45 are substantially horizontally disposed and are connected at their ends opposite the nut-like members 44 to the ends of tension adjusting screws 46 that have screw-threaded engagement with anchoring posts 47, which posts project upward from the base 17. Heads 46$^a$ on the outer ends of the tension adjusting screws 46 may be manipulated with the fingers to turn the screws inward or outward to vary the tension of the springs 45. The parts of the machine thus far described will be operated as follows:

When one of the keys in series $a$ or $b$ is depressed, the yoke 27 or 28 that is operated thereby, will be depressed therewith and the lever 32 or 33 that is connected to the depressed yoke 27 or 28 by one of the links 36, will be moved pivotally downward. The shaft 31 or 34 on which the moved lever 32 or 33 is mounted and a co-operating locker-like lever 37 or 38 will be turned in an anti-clockwise direction against the action of a co-operative coiled tension spring 45. When the depressed key is released at the bottom of its downward stroke, it will quickly be returned to an inoperative normal position by its co-operating light springs 25 and the actuated tension springs 45 will return the actuated lever 37 or 38, co-operating shaft 31 or 34 and lever 32 or 33 to their inoperative normal positions.

Near the free end of each of the arms 32 and 33 is an inwardly projecting pin or the like 48. These pins 48 work through suitable openings in the frame 18 and pivoted near the inner end of each thereof is a pawl 49 that is movable therewith and a co-operating lever 32 or 33.

The pawl 49 that is movable with the carrier by the arm 32, normally engages a ratchet wheel 50 and the pawl 49 that is carried by the arm 33 normally engages a somewhat large ratchet 51. The pawls 49 are resiliently held in contact with their respective ratchet wheels 50 or 51 by springs 52 on the pins 48.

A small ratchet wheel 50 is mounted on and for movements with a shaft 53 that is reduced at its ends to form trunnions 54 that are journaled in opposite sides of the frame 18 and the larger ratchet wheel 51 is formed with an elongated hub 55 that is journaled on the shaft 53. The elongated hub 55 is held against axial movements on the shaft 53 by engagement with the hub of the ratchet wheel 50 and a collar 56 on the shaft 53.

The ratchet wheel 50 is adapted to drive a fan or air governor 57 through the shaft 53 and a train of clock gears 58, and the ratchet 51 is adapted to drive a fan wheel or air governor 59 through its elongated hub 55 and a train of gears 60. The train of gears 58 includes a relatively large gear 61 mounted near one end of the shaft 53, a small intermediate gear 62 driven from the large gear 61 and which is suitably journaled to one side of the frame 18. A large intermediate gear 63 formed with the small intermediate gear 62 and a small pinion gear 64 near one end of the fan shaft and which shaft is indicated by the numeral 65. The fan shaft 65 is reduced at its inner end to form trunnions that are journaled in the opposite sides of the frame 18. A train of gears 60 is substantially like the train of gears 58 and includes a relatively large gear 66 mounted on the elongated hub 55 for common movements therewith, intermediate gears 67 and 68 journaled on the frame 18, and a small pinion gear 69 on a fan shaft 70 which shaft is reduced at its ends to form trunnions journaled in the frame 18.

Figure 4:
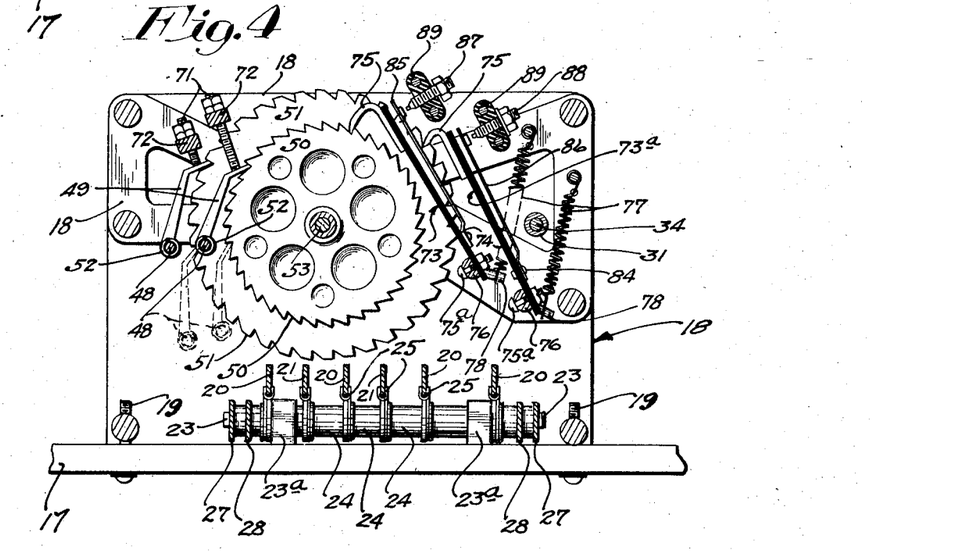
Fig. 4 is a section taken on line 4—4 of Fig. 1.
Figure 5:
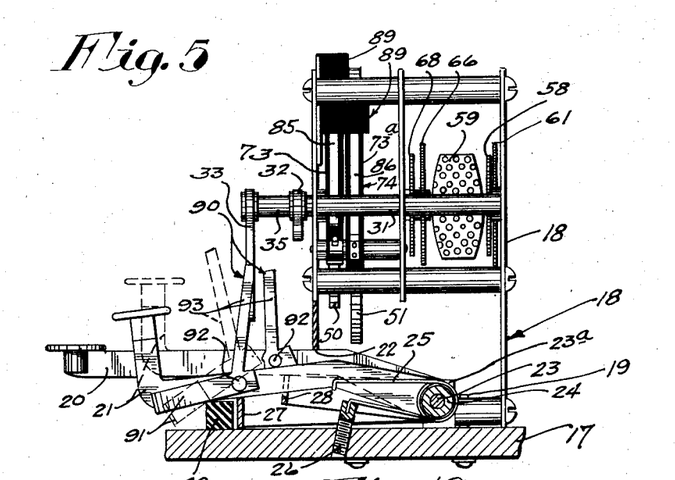
Fig. 5 is a position drawing some parts being shown in full and some parts being sectioned on the irregular line 5—5 of Fig. 2.
Figure 6:
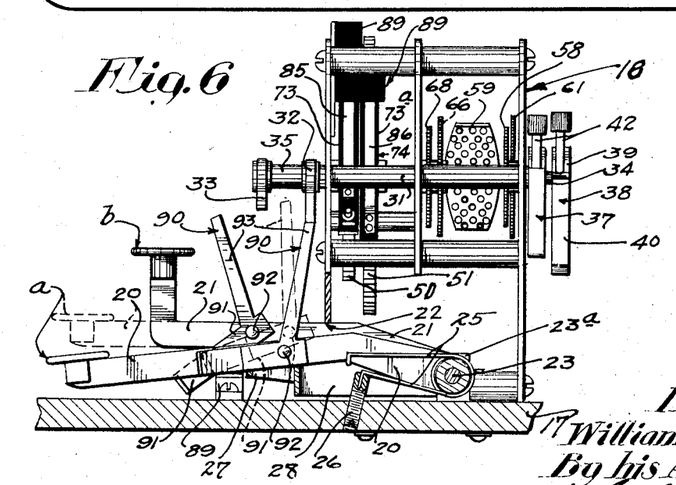
Fig. 6 is a position drawing similar to Fig. 5 with some parts being shown in full and some parts being sectioned on the line 6—6 of Fig. 2.
Figure 7:
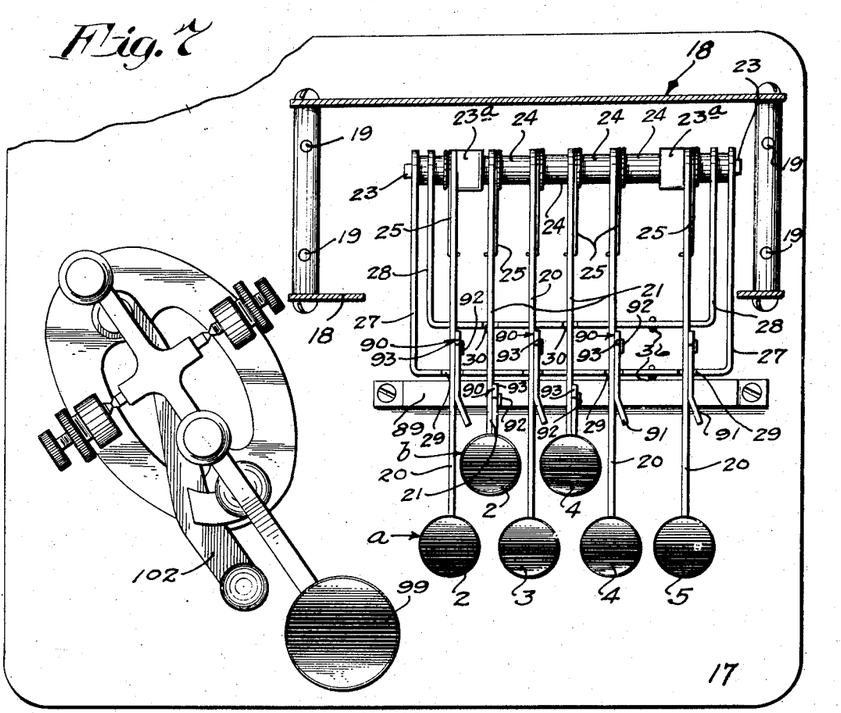
Fig. 7 is a section taken on the irregular line 7—7 of Fig. 2.
Figure 8:
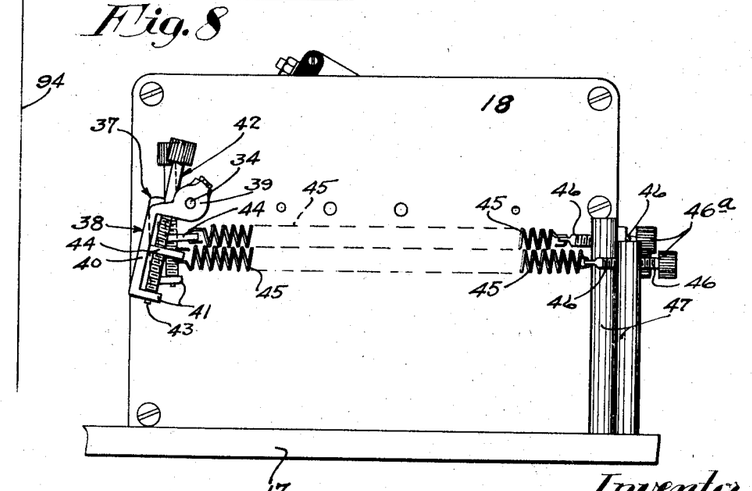
Fig. 8 is a rear view of the machine.

The pawls 49 are always under tension to be moved upward by the action of a co-operative spring 45, and in their normal uppermost positions, said pawls engage the lower ends of lock-nut-equipped stop screws 71 that project downward through frame cross members 72, see Fig. 4. The pawls 49 are thus positively held against upward or pivotal movements and will lock their co-operating ratchet wheels 50 or 51 against accidental movements in either direction. The pawls are, however, free to be moved in a downward direction with their respective arms 30 or 33. When a key in series $a$ or $b$ is depressed, the pawl 49 affected thereby will be drawn from the tooth in the ratchet with which it was engaged in a neutral position and will be drawn over the ratchet teeth in an anti-clockwise direction. At the end of the downward stroke of the depressed key, the moved pawl will engage a tooth in the ratchet a number of teeth below the neutrally engaged tooth corresponding to the number assigned to the depressed key.

When the depressed key is released, the pawl 49 that was moved downward thereby will be moved upward by the action of a co-operating spring 45 until it engages its stop screw 71. On this upward movement, the actuated pawl will move its co-operating ratchet 50 or 51 therewith in a clockwise direction, an angular distance corresponding to the number of teeth over which it was drawn on its downward movement and which number of teeth will correspond to the number assigned to the depressed key. The actuated pawl 49, when it strikes its stop screw 71, will be wedged therebetween and the engaged tooth of its co-operating ratchet, and said ratchet will be positively stopped and locked against movements until the pawl is withdrawn by depression of a co-operating key.

It should here be understood that the ratchets 50 and 51 are each retarded in their operative movements by the governor fan 57 and 58 driven thereby through the train of gears 58 or 60 and that the operative speeds of the ratchets may be independently adjusted to a very fine degree. Manipulation of an adjustment screw 42 will cause the nut-like member 44 thereon to which one end of a spring 45 is attached, to move toward or away from the pivot point of its operatively related lever 37 and 38 and will thus increase or decrease the leverage of said spring 45 thereon, and manipulation of an adjustment screw 46 will change the tension of its connected spring 45 on its respective lever 37 or 38.

The ratchets 50 and 51 act as cam wheels and are adapted to independently actuate pawl-like switch arms 73 and 73$^a$. The pawl-like switch arms 73 and 73$^a$ each include a bar 74 of insulating material and a ratchet-engaging end portion 75. At their lower ends, the bars 74 are, by means of bolts or the like 75$^a$, secured to rods 76 that are suitably pivoted at their ends to the frame 18.

The pawl-like switch arms 72 and 73 are always under tension of light springs 77 to keep their ratchet-engaging ends 75 in contact with their respective ratchets and will always hold said ratchets against movements in an anti-clockwise direction. The pawl-like switch arms should not, however, exert enough pressure on their respective ratchets to greatly retard the movement thereof in a clockwise direction. The springs 77 are, at their lower ends, attached to the outer ends of and pull upward on pins or the like 78 that project outward from the pivoted rods 76. At their upper ends, the springs 77 are fastened to spring tension adjusting devices, each including a shaft 78$^a$ pivoted at their ends in the frame 18, a fine flexible wire 79, one end of which is fastened to the upper end of one of the springs 77 and the other end of which is wound around and secured to a co-operating shaft 78$^a$, an enlarged portion 80 on the shaft 78$^a$, and a friction device 81 between the enlarged portion 80 and the inside of the frame 18. The shafts 78$^a$ are reduced at their forwardly projecting ends to form a shank 82 that is screw-threaded and a shoulder 83. Heads 79$^a$ are screwed onto the shanks 82 and against the shoulders 83 so that their respective shafts are movable therewith, but detachable therefrom. The friction devices 81 exert an endwise pressure on their respective shafts 78ᵃ between the frame 18 and the shoulder or enlarged portion 80, and hold the inner faces of the heads 79ᵃ in frictional contact with the outside of the frame 18. The shafts 78ᵃ may thus be turned by manipulation of their heads 79ᵃ against the action of the friction devices 81 to wind the wires 79 thereon or therefrom and thus change the tension of the springs 77 on the arms 72 and 73, but said friction devices will hold sufficiently to prevent the shafts from being accidentally turned.

Secured to the bars 74 of the switch arms 72 and 73, respectively, at their lower portions by rivets or the like 84 and movable pivotally therewith are resilient contacts 85 and 86. The resilient contacts 85 and 86 are spaced slightly from the bars 74 except near their points of attachment therewith and extend upward close to the end of the bars 74. Co-operating with and normally spaced slightly from the resilient contacts 85 and 86, respectively, are adjustable stationary contacts 87 and 88 that project through insulating lugs 89, which lugs are suitably secured to the frame 18.

The ratchet wheels 50 and 51 act as cam wheels for their respective co-operating switch arms 72 and 73 and when one of said ratchets are rotated, the switch arms 72 or 73 that co-operate therewith, will be oscillated back and forth and the resilient contact 85 or 86 thereon, will be moved toward and away from its respective stationary contact 87 or 88, and said contact will be alternately closed and opened one for each ratchet tooth passed under the ratchet-engaging end 75 of its respective switch arm 72 or 73. The movable contacts 85 and 86, will, however, always be out of contact with their respective stationary contact 77 and 78 when their co-operative ratchets 50 or 51 come to a stop. This is due to the fact that the end 75 of the switch arms 72 and 73 always engage the deep portions of the ratchet teeth in their neutral positions.

It should here be noted that the teeth on the small ratchet 50 are sharp and relatively short and will, therefore, when the ratchet is turned, hold the arm 72 in an outward position for only a very short time for each tooth brought into action therewith. The teeth of the ratchet 51 are longer than the teeth on the ratchet 50 and have relatively flat ends which, when the ratchet wheel 51 is rotated, will hold the switch arm 73 in an outward position for a relatively long period of time for each tooth brought into action therewith.

Manipulation of a key 2 to 5 in series $a$ will cause the ratchet 50 to rotate through an angular distance sufficient to close the contacts 85 and 87 for a series of short impulses or dots numbering from 2 to 5, and manipulation of one of the keys 2 to 4 in series $b$ will cause the ratchet 50 or 51 to rotate through an angular distance great enough to close the contacts 86 and 88 for two or four long impulses or dashes.

Figure 2:
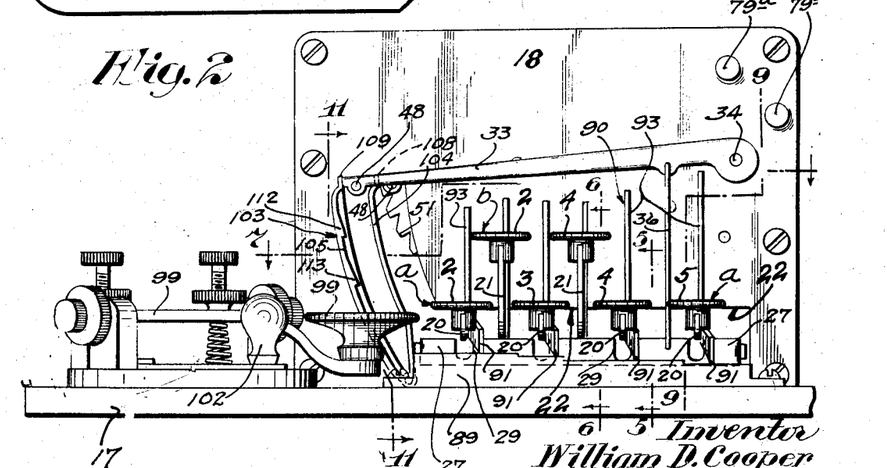
Fig. 2 is a front elevation of the device.
Figure 3:
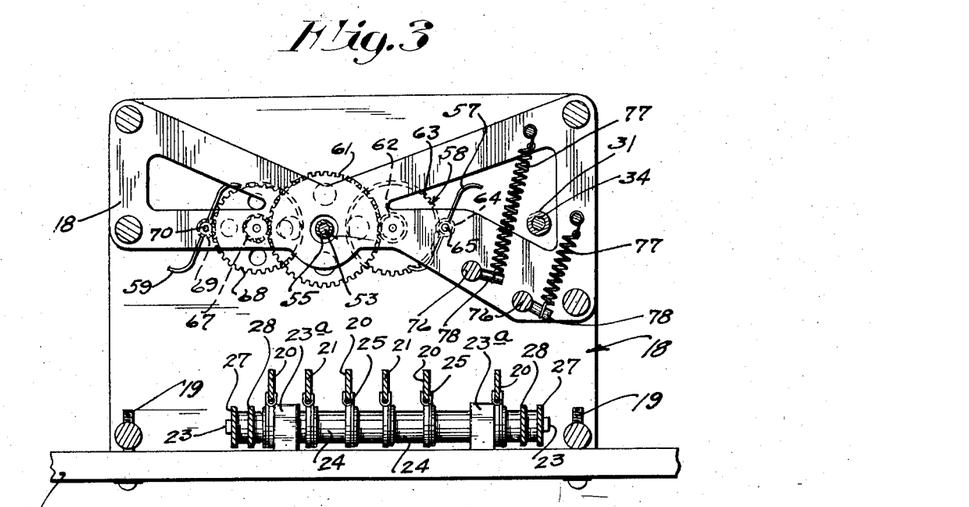
Fig. 3 is a section taken on the line 3—3 of Fig. 1.

Underlying the several levers in series $a$ and $b$ outward of the yoke 27, is a rubber buffer 89 which the key levers 20 and 21 strike at the bottom of their strokes. This buffer 89 is stepped downward progressively from left toward the right in respect to Fig. 2 (one step for each key 2 to 5, in series $a$). The highest point or top step of the buffer 89 underlies the key levers 20 and 21 on which keys 2 in series $a$ and $b$ are mounted, the next to the top step underlies the key lever 20 on which key 3 in series $a$ is mounted, the next to the lowest step underlies the levers 20 and 21 on which keys number 4 in series $a$ and $b$ are mounted, and the next or lowest point of the buffer underlies the key lever 20 on which the key 5 in series $a$ is mounted. The number of impulses transmitted when any one of the keys in series $a$ or $b$ is manipulated is dependent upon the distance said key is permitted to be depressed, and with the buffer stepped down as described, each key in series $a$ and $b$ will be permitted to be depressed the proper distance to cause the machine to transmit a number of impulses corresponding to the number assigned to the depressed key.

The buffer 89, will, in many instances, be in itself a sufficient means for limiting the downward movement of the key levers 20 and 21, but as its resilient heavy pressure on one of the keys might cause its mounting key lever 20 and 21 to compress the buffer thereunder and allow said key lever to move the pawl 49 affected thereby to be moved in an anti-clockwise direction over one more tooth on its co-operating ratchet that is indicated by the number on the depressed key. The same might also happen in case the buffer might become worn; in either of the above cases, however, the machine would become inaccurate.

As a means for accurately governing the operative movements of the key-actuated mechanism, I provide stop levers 90 that are pivoted one to each of the key levers 20 and 21. The stop levers 90 each include a lower arm 91 that is pivoted near its inner portion to one of the key levers 20 or 21 inward of the buffer 89 at 92, and an upwardly projecting arm 93. The lower arm 91 of each stop lever 90 is normally tilted pivotally downward in respect to the lever 20 or 21 on which it is mounted, and rests on the back portion of the buffer 89, and the upper end of each of the upper arms 93 is normally tilted pivotally forward or outward of and is in a lower plane than long lever 32 or 33 that is affected by the particular key lever on which said stop lever is mounted.

When any one of the key-mounting levers in series *a* or *b* is depressed by manipulation of a key thereon, the stop lever 90 pivoted thereto will be caused to move pivotally toward the frame 18 so that the upper end of its upper arm 93 will underlie the long lever 32 or 33 that is affected by the depressed key lever 20 or 21 and will positively stop the downward movement of the long lever 32 or 33. The upper arms of each stop lever 90 is of a proper length to engage its cooperating long arm 32 or 33 to stop the downward movement of the same when the machine has been set to make the number of impulses indicated on the depressed key.

Figure 16:
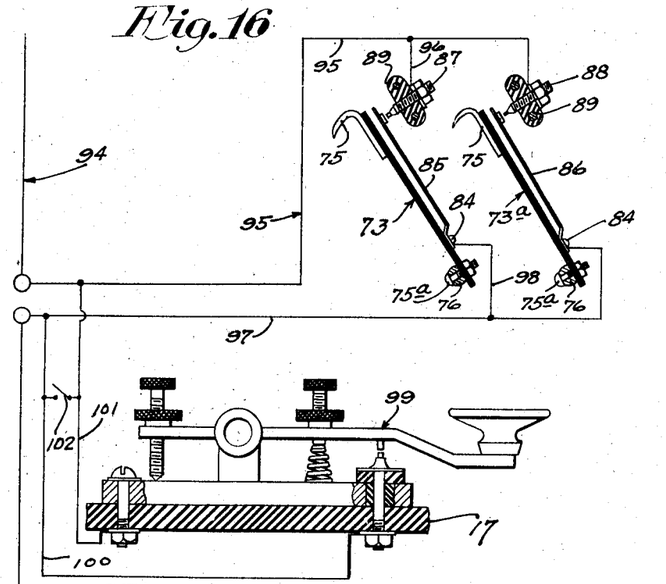
Fig. 16 is a wiring diagram showing the complete hook-up of the device.

Referring to the wiring diagram in Fig. 16, in which the main telegraphic line is indicated by the numeral 94.

The stationary contact 78 is connected to the main line 94 by a lead wire 95 and the stationary contact 77 is connected to said main line by the lead 95 and a short lead 96. The movable resilient contact 86 is connected to the line through a lead wire 97 and the resilient contact 85 is connected to the line by said lead 97 and a short lead 98. The machine thus far described will, by independent manipulation of the several keys 2 to 5, in series *a*, close the telegraphic circuit for the succession of evenly spaced dots numbering from 2 to 5 and by independent manipulation of the keys 2 to 4, in series *b*, the machine will close the line for a succession of evenly spaced dashes.

When it is desired to send one dot or one dash, a standard form of telegraphic key 99 that is mounted on the base 17 is employed in the usual manner. The standard key 99 is connected into the telegraphic line by lead wires 100 and 101 and is so located on the base 17 that it may be conveniently operated with the thumb of the right hand without removing the fingers of the hand from their positions on the other keys in series *a* or *b*. If it is desired to transmit three dashes, the key in series *b* which controls mechanism for two dashes and the standard key 99 will be depressed simultaneously and with a single movement. Both keys will be held depressed until the key 99 has closed the line 94 a sufficient time to produce one dash and then both depressed keys will be released. When said keys are released, the line 99 will be open, one dash will have been completed by manipulation of the key 99 and the mechanism controlled by the key 2 in series *b* will start functioning to alternately close and open the line 94 to produce two more dashes which will, when completed, make a total of evenly spaced dashes. Five dashes, six dots, or combinations of one dash and a series of dots or one dot and a series of dashes may be readily produced by simultaneous depression of the key 99 and a suitable key in series *a* or *b*.

When the machine is not in operation, the line 94 is normally closed by a manipulation-operated switch 102 that is made in combination with the key 99 and which is connected across leads 100 and 101.

A series of evenly spaced dots numbering from 2 to 5 followed by two or four evenly spaced dashes, can be produced with a single movement by simultaneous depression of one of the keys in series *a* and one of the keys in series *b*, and releasing both of the depressed keys at the same time. This feature is made possible by a lever-locking mechanism 103, which mechanism includes arms 104 and 105 that are secured to opposite ends of a short shaft 106 which shaft is suitably journaled in a bearing 107 on the base 17. The arms 104 and 105 are thus free for common pivotal movements. The arm 104 is directly aligned with the long lever 32 and its upper end, indicated by the numeral 108, normally engages the free end of said lever 32. The arm 105 is in direct alignment with the long lever 33 and its upper end, indicated by the numeral 109 normally engages the free end of the lever 33. Each of the arms 104 and 105 is moved throughout its intermediate portion to conform with a circle struck from the axis of its co-operative lever 32 or 33, when the arms are in their normal positions. These long curved portions are normally spaced from the ends of the arms 32 and 33 and said arms are curved rather abruptly inward at the top of the long curved portions, to meet upper ends 108 and 109 of the arms 104 and 105 to afford cam surfaces 110 and 111, respectively. On the inside of the long curved intermediate portion of the arm 105 is provided two ratchet-like teeth 112 and 113 that are inclined downward and inward in respect to the long levers 32 and 33. On the short shaft 107 is a spring 114 that engages the arm 44 and tends to move both of the arms inward and into engagement with their respective co-operating levers 32 and 33.

The operation of the lever-locking mechanism described is as follows:

For example, assume that the combination to be transmitted is four dots followed by two dashes. In this case, the key 4 in series *a* and the key 2 in series *b* will be simultaneously depressed. The long levers 32 and 33 will be moved pivotally downward to the position shown by full line in Fig. 12, and in which positions of the arms 32 and 33, the mechanism independently operated by each thereof, will be set to transmit a succession of dots or dashes, corresponding to the numbers on the depressed keys. When the levers 32 and 33 are moved pivotally downward as described, their free ends will disengage the upper ends 108 and 109 of their co-operative arms 104 and 105 and said arms will be moved pivotally inward by the spring 114 so that the free end of the lever 33 will be drawn over the surface of the curved portion of the arm 105 and over the ratchet-like tooth 112, and will be caught and locked thereunder and the lever 32 will follow the curve of the arm 104, but will remain slightly spaced therefrom. Both depressed keys will be released at the same time. The lever 32 will immediately start its upward movement to allow the machine to transmit four dots and the lever 33 will be held in a downward position under the tooth 112 until the lever 32 is passed over the cam surface 110 on the lever 104, at which time lever 32 will be back to a neutral position and four dots completed.

Figures 11, 12, 13, 14, 15:
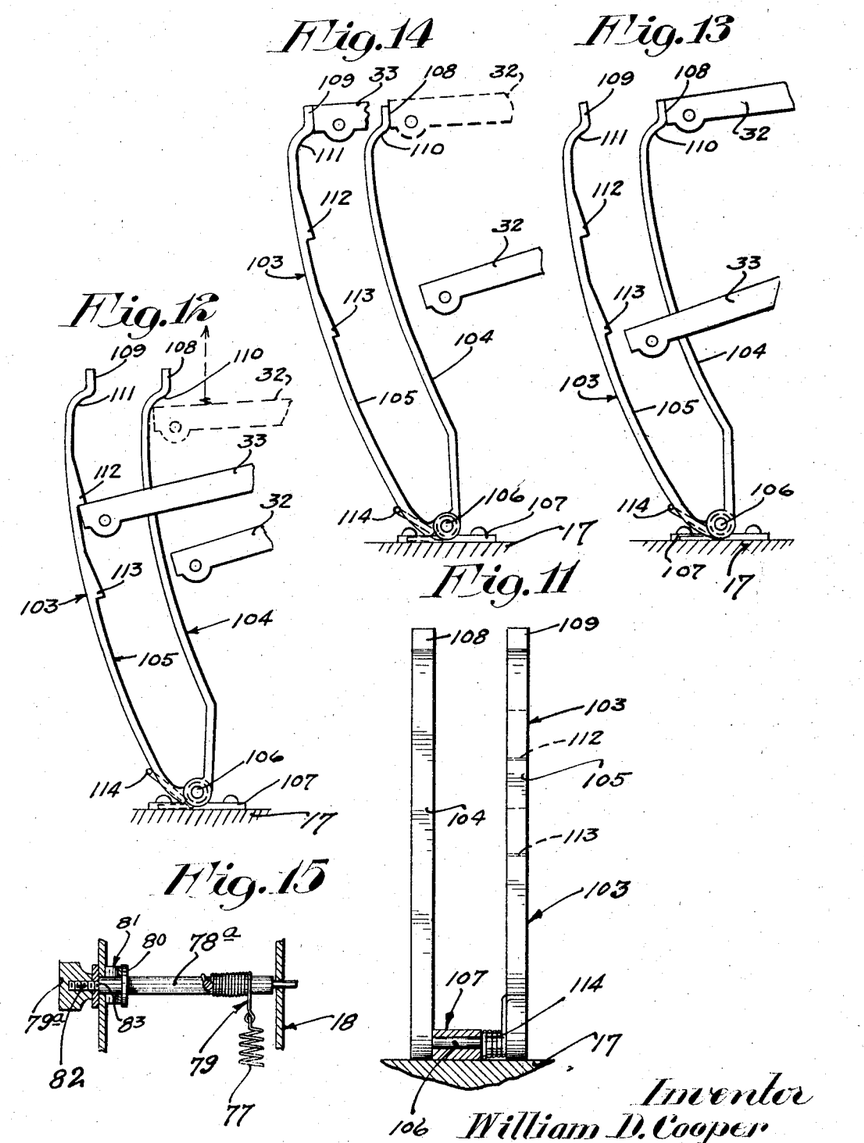
Fig. 11 is a fragmentary sectional view taken on the line 11—11 of Fig. 2 and parts being broken away and some parts not shown.
Figs. 12, 13 and 14 are detail position drawings illustrating a lever locking mechanism.
Fig. 15 is a sectional view taken on the line 15—15 of Fig. 1 with some parts being shown in full.

By reference to dotted lines in Fig. 12, it will be seen that the lever 32 will come into contact with the cam surface 110 at very nearly the top of its upward movement and will, upon continued movement, move the arms 104 and 105 pivotally inward and release the lever 33 from its locked position under the tooth 112. The lever 33 will then start on its upward movement and will allow the machine to transmit two dashes and the lever 32 will be back to its normal neutral position.

The operation of the lever-locking mechanism, when a series of dots and four dashes are transmitted, will be substantially the same as described, only that the lever 33 will be temporarily locked under the tooth 113. When either of the levers 32 or 33 are independently operated by manipulation of their respective keys, the arms 104 and 105 of the lever-locking mechanism, will be inoperative, as illustrated in Figs. 14 and 15. One dot or one dash followed by two to five dots and two or four dashes may also be produced by a single movement using two fingers and the thumb of the right hand.

It is, of course, highly desirable that each impulse, in a series of like impulses, be of the same length and also that the spacing or time interval therebetween be equal. It is, therefore, very important that the weight of each key is carried independently of its underlying cooperating yoke 27 or 28 and that a depressed key, when released, is instantly withdrawn from the cooperating yoke depressed thereby so that the weight of a depressed key will not retard the starting of a transmitter mechanism. Retarding of the transmitter mechanism, at the beginning of a series of impulses would, of course, cause the first impulse of the series to be longer than those thereafter and the spacing between the first and second impulse would be longer than those between impulses following.

The springs 25 exert light upward lifting pressure on their respective keys 20 or 21 and normally keep said keys 20 and 21 lifted against the portion of the frame 18 above the opening 22 therein. These springs 25 do, therefore, hold all of the inoperative keys in their neutral positions when a cooperating yoke 28 or 29 is depressed by another key in a series and also said springs 25 return the keys 20 or 21 to their upper or inoperative positions independent of and ahead of their cooperating yokes depressed thereby. The rapidity of return movement of a depressed key 20 or 21 will, of course, depend upon the tension of a cooperating spring 25 and this may be readily adjusted by means of a cooperating tension adjustment screw 26. The springs 25, when properly adjusted, will return a depressed key to a neutral position very rapidly and in fact under most conditions the keys will be moved out of engagement with the yoke depressed thereby before said yoke has started its return movement.

What I claim is:

1. In a telegraph transmitting instrument, a means for opening and closing a telegraphic circuit including a rotary member and a non-rotary member, means for intermittently driving said rotary member including a member mounted for oscillatory or rocking movements, a series of keys, means for operatively connecting each key in the series of keys to turn the said oscillatory or rocking member a predetermined different distance away from its neutral position, means for returning said oscillatory or rocking member back to its neutral position, and an operative connection between said oscillatory or rocking member and said rotary member, whereby said rotary member will be driven from said oscillatory or rocking member on its return movement to a neutral position.

2. In a telegraph transmitting instrument, a means for opening and closing a telegraphic circuit including a rotary member and a non-rotary member, means for intermittently driving said rotary member including a lever mounted for oscillatory movements, a series of depressible keys, means for operatively connecting each key in the series of keys to the lever to move the same a different predetermined angular distance away from its neutral position for each key depressed, and tension means for returning said oscillatory lever to its neutral position, and a means carried by said lever operative directly on said rotary member to drive the same from said lever on its return movement to a neutral position.

3. In a telegraph transmitting instrument means for opening and closing a telegraphic circuit including a normally stationary ratchet-like wheel, a stationary contact, and a movable contact that is adapted to be moved into and out of engagement with the stationary contact by camming action of the ratchet teeth when said ratchet is rotated, means for intermittently driving said ratchet including a lever mounted for oscillatory pivotal movements, a tension device operative on said lever to return the same to a normal position when moved therefrom, a pawl carried by said lever and operative on said ratchet, a series of keys, an operative connection between each of said keys and said lever whereby when any one of the keys is manipulated the lever and pawl will be moved pivotally against the action of tension device, said pawl being inoperative on said ratchet on its movement away from its normal position but operative thereon to move the same therewith when said lever and pawl are returned to their normal positions by the spring tension device.

4. The structure defined in claim 3 in which manipulation of each of the keys in the series will render a different predetermined number of ratchet teeth operative on the movable contact.

5. In a telegraph transmitting instrument, a normally stationary toothed wheel, means for intermittently driving said toothed wheel including a shaft journaled for oscillatory movements, a lever mounted on said shaft for oscillatory movements therewith, a spring operative on said shaft to normally hold the same and said lever in a normal position and to return the same thereto when moved therefrom, a spring-pressed pawl carried by said lever near its free end and normally engaging the teeth of the toothed wheel, a series of keys, a yoke operative by manipulation of each key in the series of keys, a connection between said yoke and said lever whereby manipulation of any one of the keys will cause said lever to move pivotally away from its neutral position and the pawl carried thereby will be drawn over a predetermined number of teeth in the toothed wheel and be inoperative on teeth on its movement away from the neutral position, but operatively engageable with the last tooth over which it was drawn to move the toothed wheel therewith on its return movement to a neutral position, and a moveable contact adapted to be vibrated once for each tooth in the ratchet wheel drawn thereby.

6. In a telegraph transmitting instrument, a normally stationary ratchet-like wheel, means for intermittently driving said ratchet-like wheel including a shaft journaled for oscillatory movements, a primary lever means mounted on the shaft for oscillatory movements therewith, a tension spring connected to said primary lever and under tension to turn the same and the shaft, a secondary lever means mounted on said shaft for movements therewith and said primary lever, a pawl carried by said secondary lever means and engageable with the teeth of the ratchet, means for opening and closing a telegraphic circuit, a series of keys, means for connecting each key in the series of keys to turn the oscillatory shaft, primary and secondary levers and pawl a predetermined distance away from their normal positions against the action of the tension spring, said pawl being inoperative on the ratchet teeth on its movement away from its neutral position but operative thereon to drive said ratchet on its return movement.

7. In a telegraphic transmitting instrument, a switch mechanism for opening and closing a telegraphic circuit, two series of independently operable keys, driving mechanism under control of each key in one series to operate the switch mechanism to transmit a predetermined different number of dots, and mechanism under control of each key in the other series to operate the switch mechanism to transmit a different predetermined number of dashes, a normally inactive mechanism operative on the switch-operating mechanism when one key in each series is simultaneously manipulated to cause the same to operate the switch mechanism to transmit first a number of impulses of the class of impulses allotted to one of the depressed keys and when completed to operate the switch mechanism to transmit a number of impulses of the other class allotted to the other manipulated key.

8. The structure defined in claim 6 in further combination with a means for varying the leverage of the tension spring on said primary lever.

9. The structure defined in claim 6 in further combination with means for changing the tension and leverage of the tension spring on the primary lever.

10. In a telegraph transmitting instrument, a series of keys and means for opening and closing a telegraphic circuit including a rotary member and a non-rotary member, a means for intermittently driving said rotary member including a lever mounted for pivotal movements, and a tension device operative on said lever and means for operatively connecting each key in a series of keys to move said lever pivotally against the action of the tension device.

11. In a telegraph transmitting instrument, two series of keys, one for sending dots and the other for sending dashes, a transmitting circuit, switch mechanism in said circuit, mechanically timed mechanism intermediate of said keys and switch mechanism whereby the depression of a dot key will close the circuit for a succession of short intervals and the depression of a dash key will close the circuit for a succession of relatively long intervals, a normally inactive means for controlling the mechanically timed mechanism whereby, when one key of each series is simultaneously depressed and simultaneously released, the mechanically timed mechanism will close the switch mechanism first for a predetermined number of one class of impulses and when said first produced class of impulses are completed said mechanically timed mechanism will close the switch mechanism for a predetermined number of the other class of impulses.

12. In a telegraph transmitting instrument, a normally stationary toothed wheel, means for intermittently driving said toothed wheel including a shaft journaled for oscillatory movements, a lever mounted on said shaft for oscillatory movements therewith, a spring operative on said shaft to normally hold the same and said lever in a normal position and to return the same thereto when moved therefrom, a spring-pressed pawl carried by said lever near its free end and normally engaging the teeth of the toothed wheel, a series of keys, a yoke operative by manipulation of each key in the series of keys, a connection between said yoke and said lever whereby manipulation of any one of the keys will cause said lever to move pivotally away from its neutral position and the pawl carried thereby will be drawn over a predetermined number of teeth in the toothed wheel and be inoperative on teeth on its movement away from the neutral position, but operatively engageable with the last tooth over which it was drawn to move the toothed wheel therewith on its return movement to a neutral position.

13. In a telegraph transmitting instrument, a normally stationary ratchet-like wheel, means for intermittently driving said ratchet-like wheel including a shaft journaled for oscillatory movements, a primary lever means mounted on the shaft for oscillatory movements therewith, a tension spring connected to said primary lever and under tension to turn the same and the shaft, a secondary lever means mounted on said shaft for movements therewith and said primary lever, a pawl carried by said secondary lever means and engageable with the teeth of the ratchet, means for opening and closing a telegraphic circuit, a series of keys, means for connecting each key in the series of keys to turn the oscillatory shaft, primary and secondary levers and pawl a predetermined distance away from their normal positions against the action of the tension spring, said pawl being inoperative on the ratchet teeth on its movement away from its neutral position but operative thereon to drive said ratchet on its return movement, and a stop arranged to engage said pawl when it is returned to its neutral position, whereby said pawl will be positively stopped and caused to retain engagement with an engaged ratchet tooth and thereby positively stop said ratchet.

14. In a telegraph transmitting instrument means for opening and closing a telegraphic circuit including a rotary member and a non-rotary member, means for intermittently driving said rotary member including a series of keys, a member common to all of said keys and adapted to be moved a different distance by each thereof, means operative to return said common key actuated member to a neutral or starting position when moved therefrom by a key, a connection between said common key actuated member and said rotary member operative to impart movement to said rotary member on the return movement of said common key actuated member to a neutral position, and means for returning depressed keys to a neutral position independently of the return movement of said common key actuated member.

15. The structure defined in claim 1 in which the said means for operatively connecting each key in a series of keys to turn said oscillatory or rocking member a predetermined distance away from its neutral position includes a member that is common to all of said keys and arranged to be moved a different distance by each thereof, and an operative connection between said common key actuated member and said oscillatory or rocking member.

16. The structure defined in claim 1 in which the said keys are depressible and in which said means for operatively connecting each key in a series of keys to turn the oscillatory or rocking member a predetermined distance away from its neutral position includes a member underlying each of said keys and arranged to be moved a different distance by each key depressed, and an operative connection between said common key actuated member and said oscillatory or rocking member.

In testimony whereof I affix my signature.

WILLIAM D. COOPER.